US008581852B2

(12) United States Patent
Izadi et al.

(10) Patent No.: US 8,581,852 B2
(45) Date of Patent: Nov. 12, 2013

(54) FINGERTIP DETECTION FOR CAMERA BASED MULTI-TOUCH SYSTEMS

(75) Inventors: Shahram Izadi, Cambridge (GB); Stuart Taylor, Cambridge (GB); Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1468 days.

(21) Appl. No.: 11/940,822

(22) Filed: Nov. 15, 2007

(65) Prior Publication Data

US 2009/0128499 A1    May 21, 2009

(51) Int. Cl.
  *G09G 5/00*  (2006.01)
(52) U.S. Cl.
  USPC .......................... 345/173; 345/175
(58) Field of Classification Search
  USPC ................ 345/173–179; 178/18.01–18.09
  See application file for complete search history.

(56) References Cited

U.S. PATENT DOCUMENTS

| | | | |
|---|---|---|---|
| 5,483,261 A | | 1/1996 | Yasutake |
| 6,061,177 A | | 5/2000 | Fujimoto |
| 6,147,678 A | | 11/2000 | Kumar et al. |
| 7,465,914 B2 * | | 12/2008 | Eliasson et al. ............... 345/175 |
| 2001/0052895 A1 * | | 12/2001 | Anvekar ....................... 345/173 |
| 2006/0007170 A1 | | 1/2006 | Wilson et al. |
| 2006/0010400 A1 | | 1/2006 | Dehlin et al. |
| 2006/0044282 A1 | | 3/2006 | Pinhanez et al. |
| 2006/0114237 A1 | | 6/2006 | Crockett et al. |
| 2006/0227120 A1 | | 10/2006 | Eikman |
| 2008/0088593 A1 * | | 4/2008 | Smoot .......................... 345/173 |

OTHER PUBLICATIONS

Han, "Low-Cost Multi-Touch Sensing through Frustrated Total Internal Reflection", at <<http://delivery.acm.org/10.1145/1100000/1095054/p115-han.pdf?key1=1095054&key2=8547818811&coll=GUIDE&dl=GUIDE&CFID=27909842&CFTOKEN=34971600>>, AACM, 2005, pp. 115-118.
Izadi, et al., "C-Slate: A Multi-Touch and Object Recognition System for Remote Collaboration using Horizontal Surfaces", available at least as early as Aug. 22, 2007, at <<http://research.microsoft.com/users/antcrim/papers/Criminisi_tabletop2007.pdf>>, pp. 8.
Smith, et al., "Low-Cost Malleable Surfaces with Multi-Touch Pressure Sensitivity", pp. 4.
"Touch Sensitive Table for Command and Control Applications", available at least as early as Aug. 22, 2007, at <<http://www.dohse.us/Touch_Table_Command_Control.pdf>>, pp. 1.
Wilson, "PlayAnywhere: A Compact Interactive Tabletop Projection-Vision System", at <<http://research.microsoft.com/~awilson/papers/Wilson%20PlayAnywhere%20UIST%202005.pdf>>, ACM, 2005, pp. 10.

* cited by examiner

*Primary Examiner* — Regina Liang
(74) *Attorney, Agent, or Firm* — Zete Law, P.L.L.C.; MacLane C. Key

(57) ABSTRACT

Touch detection systems and methods are described. The system comprises a light guiding sheet, a light source, a reflective layer and a detector. When a fingertip or other suitable object is pressed against the light guiding sheet, light which is undergoing total internal reflection within the sheet is scattered. The scattered light is reflected by the reflective layer and detected by the detector. In an embodiment, the light is infra-red light. The touch detection system may, in some embodiments, be placed on a display and the touch events used to control the display.

16 Claims, 14 Drawing Sheets

FINGERTIP DETECTION FOR CAMERA BASED MULTI-TOUCH SYSTEMS

BACKGROUND

Touch based systems provide an intuitive way of interacting with digital content displayed on a display screen and touch detection capabilities are increasingly being introduced into mobile computing devices, such as personal digital assistants (PDAs), tablet PCs, digital music players and mobile telephones. Some of these devices require use of a particular stylus, however many devices allow use of any implement for touch interaction, including a user's finger. Whilst many devices are able to detect single touch events, distinguishing between multiple concurrent touch events is more complex and there are few commercially available devices with multi-touch capability.

Multi-touch systems have been demonstrated which use frustrated total internal reflection (FTIR) and an example system is shown in FIG. 1. A light emitting diode (LED) 101 is used to shine light into an acrylic pane 102 and this light undergoes total internal reflection (TIR) within the acrylic pane 102. When a finger is pressed against the top surface 103 of the acrylic pane 102, it causes light to be scattered. The scattered light passes through the rear surface 104 of the acrylic pane and can be detected by a camera 105 located behind the acrylic pane 102. Such touch sensing may be combined with a rear projection system which projects an image onto the rear surface of the acrylic pane.

Another technique for multi-touch detection which has been demonstrated uses a camera placed above a horizontal display surface. Image processing techniques are then used to determine when and where the user is touching the surface. Use of such a top-down configuration enables physical objects, such as documents or games pieces, in addition to hands and fingers, to be recognized. Such physical objects may not cause FTIR and therefore may not be recognized in an FTIR system or alternatively it may be features on the top surface of the object (i.e. the surface away from the acrylic pane) which may be used for recognition.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Touch detection systems and methods are described. The system comprises a light guiding sheet, a light source, a reflective layer and a detector. When a fingertip or other suitable object is pressed against the light guiding sheet, light which is undergoing total internal reflection within the sheet is scattered. The scattered light is reflected by the reflective layer and detected by the detector. In an embodiment, the light is infra-red light. The touch detection system may, in some embodiments, be placed on a display and the touch events used to control the display.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
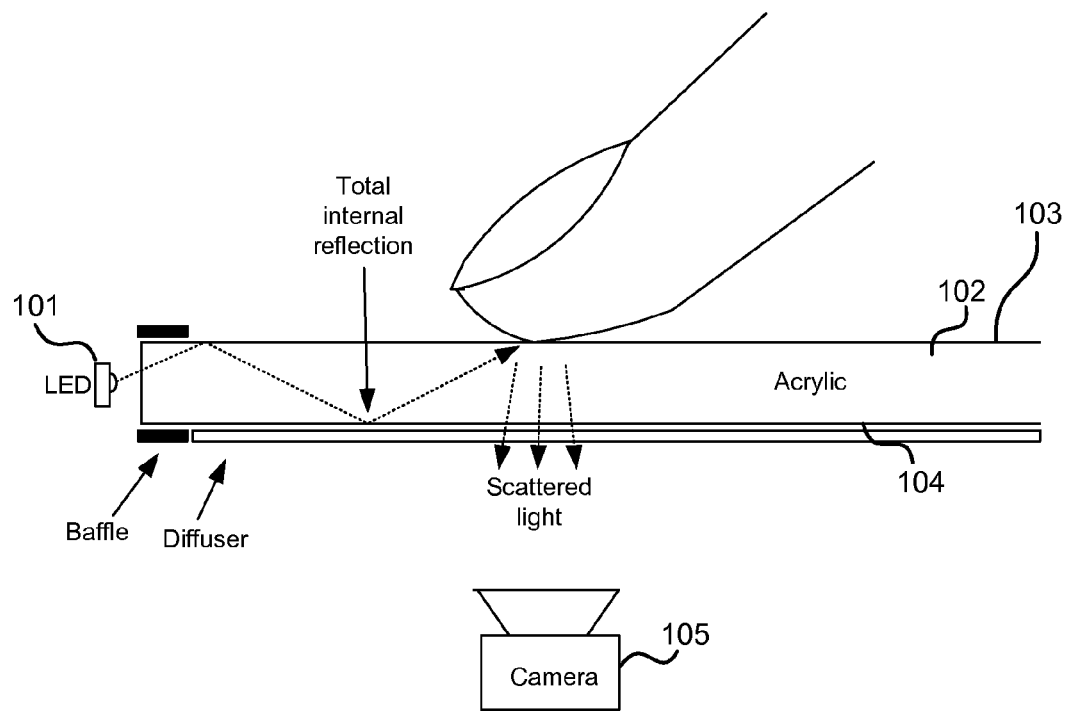
FIG. 1 is a schematic diagram of a multi-touch system using frustrated total internal reflection.
Figure 2:
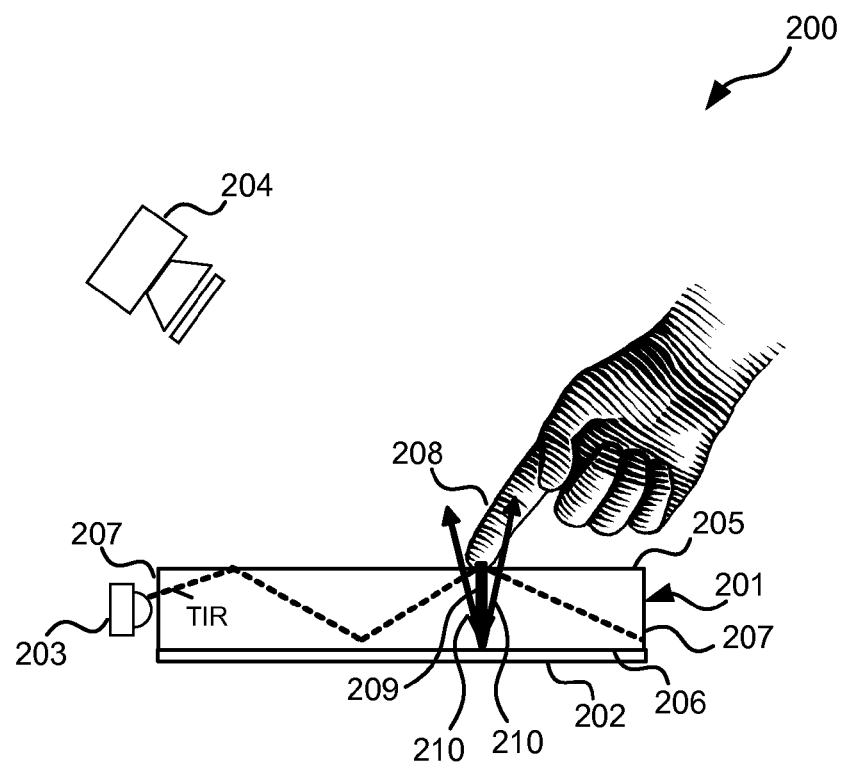
FIG. 2 is a schematic diagram of an example touch detection system.

FIG. 2 is a schematic diagram of a touch detection system 200 which comprises a light guiding sheet 201, a reflective layer 202, a source 203 and a detector 204. The light guiding sheet 201 has a touch surface 205, a rear surface 206 and edges 207 which connect the two surfaces 205, 206. The source 203 is arranged to couple light into an edge 207 of the light guiding sheet 201, such that the light undergoes total internal reflection (TIR) within the sheet 201. The reflective layer 202 is parallel to, and in proximity to, the rear surface 206 of the light guiding sheet 201. The detector 204 is arranged in front of the touch surface 205 of the light guiding sheet 201 (i.e. on the same side of the touch surface as the user) such that can detect light which is reflected by the reflective layer 202. The elements of the system are described in more detail below.

The term 'light' herein is used to refer to electromagnetic radiation of any wavelength, including, but not limited to, visible light, infra-red (IR) and ultra-violet (UV).

Figure 3:
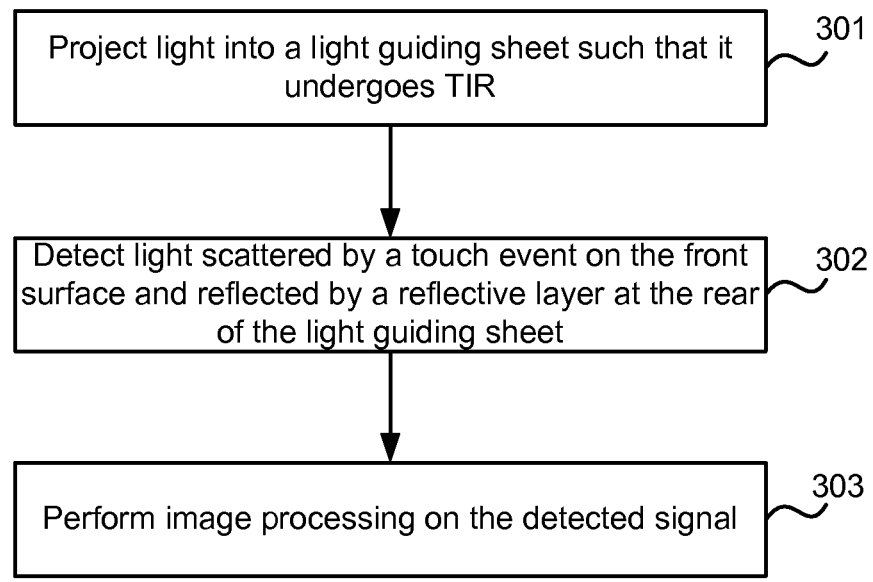
FIG. 3 is a flow diagram of an example method of operation of a touch detection system.

The operation of the touch detection system 200 can be described with reference to the flow diagram shown in FIG. 3. The source 203 emits light which is coupled into the light guiding sheet 201 such that it exhibits TIR within the light guiding sheet 201 (block 301). When a fingertip 208 is touched against the touch surface 205, light is scattered (as indicated by arrow 209) and scattered light which is incident on the reflective layer 202 is reflected (as indicated by arrows 210). This reflected scattered light is detected by the detector 204 (block 302), which generates a signal which is representative of the light detected. If there are multiple touch events, whether concurrent or temporally separate, the detector will detect reflected scattered light from each touch event. In some embodiments, image processing (block 303) may be performed on the detected signal and this is described in more detail below.

The light guiding sheet 201 may be any suitable size and shape which enables light to be totally internally reflected. Example materials include, but are not limited to, glass, acrylic (i.e. polymethyl methacrylate, which is sold under various trade names, such as Perspex™) and other polymers. Whilst the sheet is shown having a constant thickness, in some embodiments the sheet may have varying thickness although the material properties will need to be controlled (e.g. through variable refractive indices) such that TIR can still occur. In an example, the sheet may be a wedge shape, with the thickness varying substantially linearly across at least a portion of the sheet. Whilst in the examples described herein, the sheet is shown as rectangular, this is by way of example only and the sheet may be of any shape. The thickness of the sheet may be dependent, in some embodiments, on the size of the sheet such that the sheet is relatively rigid; however, this may not be required in some embodiments, e.g. where the sheet is mounted in a frame or on another surface. In other embodiments, the sheet may be flexible. In an embodiment, the sheet may comprise a 4 mm thick sheet of acrylic.

The edges 207 of the sheet where light is not coupled into the sheet may be coated or otherwise treated to prevent light from being emitted from these edges (e.g. through use of a reflector or reflective coating or an absorber or absorbent coating). In other examples, the edges may be masked to prevent light which escapes from the edges from being detected by the detector 204. This masking may be achieved using an opaque material which covers the touch surface around its edges and extends over the edges so as to block light which escapes from the edges from being captured by the detector.

In some examples, the light guiding sheet 201 may have an anti-scratch coating on its touch surface 205; however, light scattered from scratches in the touch surface of the sheet does not significantly affect the operation of the device and therefore such a layer may be optional even where the sheet is made from a relatively soft material (e.g. a soft plastic or polymer material). In another example, image processing may be used to remove stray reflected light (referred to herein as 'noise') caused by scratches, as described in more detail below.

Whilst in the above description, the light guiding sheet is described and shown as being planar, in other examples the light guiding sheet may be non-planar. For example, the light guiding sheet may be curved (e.g. like a bowl) and in this example may be relatively rigid. In other examples the sheet may be formed into other shapes, for example such as to conform to the shape of another item or to form an aesthetically pleasing shape. As described above, the light guiding sheet may be of any suitable size, shape (including planar/non-planar) and rigidity which enables light to be totally internally reflected.

The source 203 may comprise any light source which emits light which can be coupled into the light guiding sheet such that it is totally internally reflected. In an example, the source may comprise one or more LEDs. In other embodiments, the source may comprise one or more lasers. The wavelength (or wavelength range) of the source may be dependent on the specific implementation and the wavelength(s) chosen also affects the choice of reflective layer 202 and detector 204 as described below. In many of the examples described below, the source comprises one or more IR LEDs. IR is not visible to users and is reflected partially by human tissue. In other examples, other wavelengths may be used, such as red light, or a combination of different wavelengths (or wavelength bands) may be used.

The source 203 may comprise a single source or an array of sources and the sources may be provided on one edge 207 of the light guiding sheet or on multiple edges of the sheet. Depending on the implementation, use of multiple sources may assist with accuracy and/or reduce the overall form factor. The power of each source 203 may be selected in combination with the arrangement of sources such that the working area of the light guiding sheet is illuminated, i.e. such that TIR occurs over the area where detection of touch events is required. The working area of the light guiding sheet may only be a portion of the entire sheet and therefore the source (or sources) may, in some examples, not illuminate the entire sheet. In an example, an array of IR LEDS of approximately 10 cm in length and output power of 1-2 W may be used along one edge of the light guiding sheet.

Coupling means, such as a lens, gel (e.g. index-matching gel) or resin, may be used to enhance coupling of the light emitted from the source into the light guiding sheet. In an embodiment, the source may be embedded within the light guiding sheet 201. In another example where the source comprises an LED the coupling may be achieved by polishing the surface of the LED and butting the flat polished surface against an edge of the light guiding sheet.

The reflective layer 202 may comprise any suitable material and may be a planar sheet which is substantially in contact with the rear surface 206 of the light guiding sheet 201. In another example, the reflective layer 202 may comprise a layer which is deposited on the rear surface 206 of the light guiding sheet. In a further example, the reflective properties may be provided by a surface onto which the light guiding sheet is placed. The required reflective properties of the layer are dependent, at least in part, on the particular implementation of the system 200, such that the layer reflects at least one wavelength which is emitted by the source 203. In an example, the source may be an IR source, and the reflective layer may comprise a layer which reflects IR, such as AgHT or ITO (Indium tin oxide). AgHT is a silver coated film originally designed for shielding electromagnetic and radio frequency interference (EMI and RFI). There are several variants of AgHT with differing electrical surface resistance and in an implementation, AgHT-4 may be used. In some embodiments, the reflective layer may be chosen to be transparent to visible light. AgHT and ITO are also suitable in such an embodiment.

The detector 204 may comprise any suitable means of detecting light which is scattered by a touch event and reflected by the reflective layer 202. The choice of detector 204 is therefore dependent, at least in part, on the particular implementation of the system 200 and in particular on the choice of wavelength of operation (which is a consequence of the choice of source 203 and reflective layer 202). The detector 204 may include a filter 211 to prevent wavelengths other than the wavelength (or wavelength range) of operation from being detected or from saturating the detector. The detector may include other filters, in addition or instead, such as a polarizing filter. Examples of suitable detectors include, but are not limited to, cameras and photosensors (such as photodiodes). Depending on the implementation, use of multiple detectors may assist with accuracy, and/or reduce the risk of occlusion and/or reduce the overall form factor. The detector may be orientated in any suitable manner with respect to the light guiding sheet such that it can capture light reflected by the reflective layer, e.g. anywhere in the range from parallel to the touch surface to perpendicular to the touch surface.

In an example implementation, the source 203 may comprise an IR source (e.g. an IR LED), the reflective layer 202 may reflect IR (e.g. an AgHT sheet) and the detector may comprise an IR detector (e.g. a camera with an IR pass filter in front of it). The light from the IR source is coupled into the light guiding sheet and is totally internally reflected within the sheet. Use of IR means that this light is invisible to human perception. Fingers are approximately 20% reflective to IR, such that when a finger is touched onto the light guiding sheet, some of the IR reflecting within the sheet is scattered downwards (in the orientation as shown in FIG. 2). This scattered IR light is reflected back up by the IR reflective layer and exits from the light guiding sheet underneath the fingertip which is making contact. Some of the scattered and reflected IR passes through the user's finger and some passes around the sides and this is detected by the IR detector above the light guiding sheet. The scattered IR which is reflected and passes through and around the fingertip provides a very clear signal which can be captured by the detector. An image detected by an IR camera shows the fingertips glowing brightly compared to the surrounding area. As the signal is very clear, image processing techniques which have a low computational cost may be used, and these are described below. Image processing techniques which are more computationally expensive may also be used, either in combination with any of the lower cost techniques or instead of these techniques.

Any of the examples described herein may use IR. Where visible (e.g. red) light is used instead of IR, the detector may include a polarization filter to remove any polarized light which may be emitted from a liquid crystal display (LCD). It may also be necessary to include means for reflecting ambient light so that sunlight does not affect operation and an example rejection technique is described below with reference to FIG. 12. Where visible light is used, the detector may include a chromatic filter to ensure that only light of the particular wavelength of interest is captured by the detector. Additionally when visible light is used the reflective layer may be provided by another element in the system. For example, it may be provided by the surface onto which the light guiding sheet is placed (e.g. a white board or projection surface as in the example described below with reference to FIG. 10). In another example, the reflective layer may be provided by the rear surface of an LCD. Where other wavelengths of electromagnetic radiation are used, such as UV or near UV, different filters may be used in the detector.

As light is only scattered when a fingertip is actually in contact with the touch surface 205 of the light guiding sheet, the system provides an accurate means of detecting touch events. When a fingertip is in close proximity to, but not in contact with, the touch surface, the TIR is not disrupted and therefore no light will be scattered and subsequently captured by the detector.

The system 200 enables detection of single touch events or multiple touch events. If there are large numbers of simultaneous touch events by multiple users, the detector position may be selected to avoid occlusions or multiple detectors may be used.

The system 200 described above may be integrated with a display surface. The display surface may be any suitable means of displaying information, including but not limited to, an LCD, a projector screen, a whiteboard etc. The display surface may be part of a display system, e.g. the system 200 may be integrated with a tablet PC or with a projector system, or may be added onto a display system, e.g. as an overlay to a tablet PC or whiteboard. This enables the system to be used to retrofit touch detection capabilities to an existing system. Examples of these implementations are described in more detail below. As the light guiding sheet is clear, it does not affect display quality and as the sheet can be relatively thin (e.g. a few millimeters thick) it can be placed over a tablet display to enable both multi-touch and high resolution stylus based input. Furthermore, as the computational load of any image processing is small, the system can be integrated into mobile devices with limiting processing power and/or battery life.

The system 200 may also be used in combination with other touch-detection technologies, such as 'C-Slate', as described in 'C-Slate: Exploring Remote Collaboration on Horizontal Multi-touch Surfaces' by S. Izadi, A. Agarwal, A. Criminisi, J. Winn, A. Blake, A. Fitzgibbon and published in Proc. IEEE Tabletop 2007, and 'PlayAnywhere', as described in 'PlayAnywhere: A Compact Tabletop Computer Vision System' by A. Wilson and published at the Symposium on User Interface Software and Technology (UIST), 2005. Such combinations provide accurate touch/no touch determination along with the added features of the more computationally intense techniques (e.g. hover detection, document recognition etc).

In other examples, the system may not be placed on or comprise a display. In an example, the touch detection system of FIG. 2 may be provided on a desk or table and provide a user input device for a computing device (e.g. a PC or a gaming device).

Unlike many known systems, the system of FIG. 2 does not require any particular force to be applied to the light guiding sheet in order to detect the touch event. Imaging processing techniques may however be used to detect the pressure applied to the sheet through calibration of a user's fingertip size when pushed against the sheet at a normal pressure (e.g. on initial touch of the sheet). This can be compared to subsequent detector touch events where larger areas may indicate increased pressure. In another example, the pressure may be detected through changing light levels captured by the detector as an increase in pressure applied to the light guiding sheet results in an increase in the amount of scattered and reflected light which reaches the detector.

Figure 4:
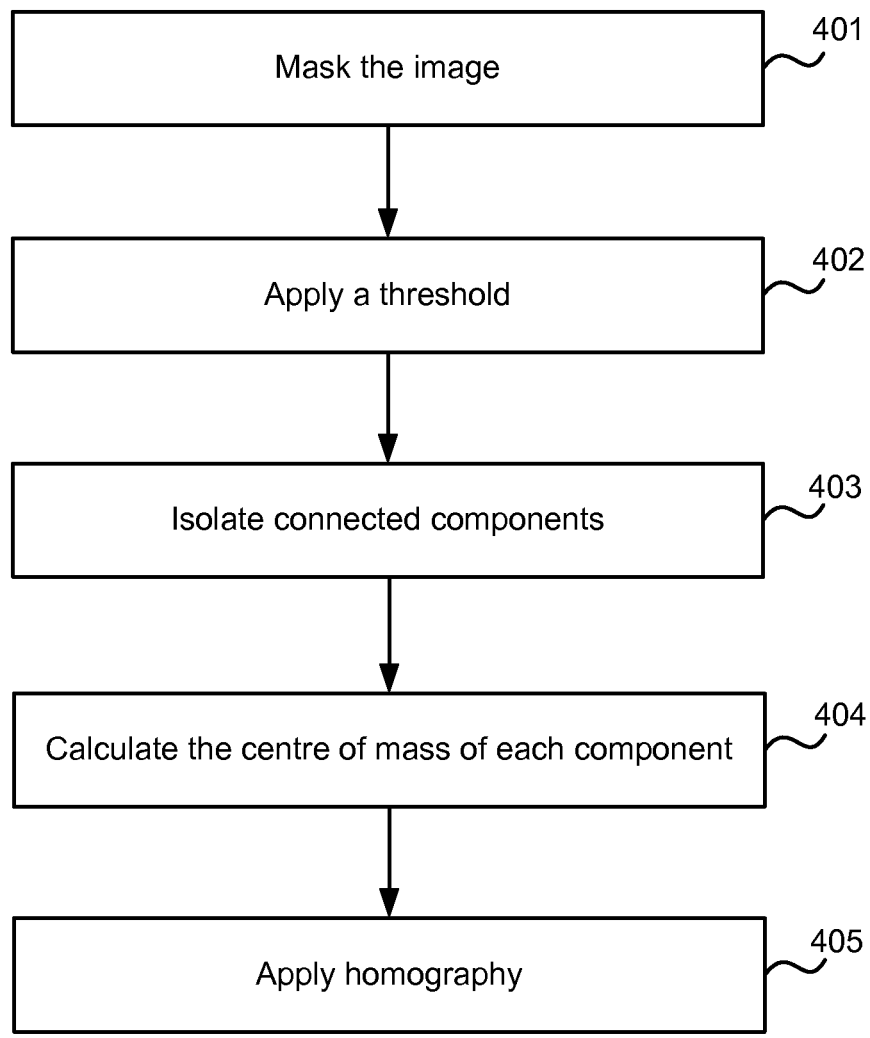
FIG. 4 is a flow diagram which shows a step of the method of FIG. 3 in more detail.

As described above, image processing techniques may be applied to the image captured by the detector (block 303). In an example, as shown in the flow diagram of FIG. 4, one or more of the following techniques may be applied:
 Image masking (block 401)
 Thresholding (block 402)
 Isolating connected components (block 403)
 Calculating the centre of mass of each component (block 404)
 Applying homography to map fingerprint positions to onscreen coordinates (block 405)
These techniques may be applied in an order which is different to that shown in FIG. 4. In an implementation, only the first two techniques (blocks 401 and 402) may be applied and these may be applied in either order.

Figure 5:
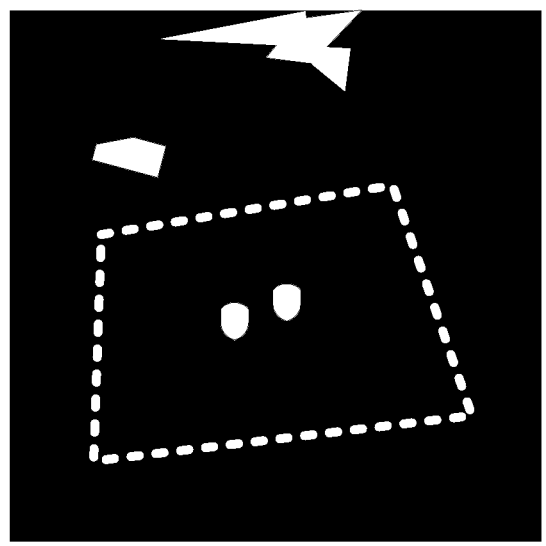
FIG. 5 shows an example output of an image processing step.

Image masking (block 401) involves masking the detected image to remove artifacts outside of the working area, i.e. all data outside the area of interest is ignored. This eliminates stray signals which may have been detected as a result of, for example, bleeding of IR light from edges of the light guiding sheet or poor coupling of light from the source into the light guiding sheet. Thresholding (block 402) uses a threshold light level to convert the detected signal into a binary image. FIG. 5 shows an example output of image processing using these two steps (blocks 401 and 402), in which two white regions where two fingertips were in contact with the light guiding sheet can be clearly seen and the white dotted line indicates the working area outside of which is masked. As a result of the thresholding the rest of the working area, apart from the two fingertips, is black. In other examples, multiple thresholds may be used.

Figure 6:
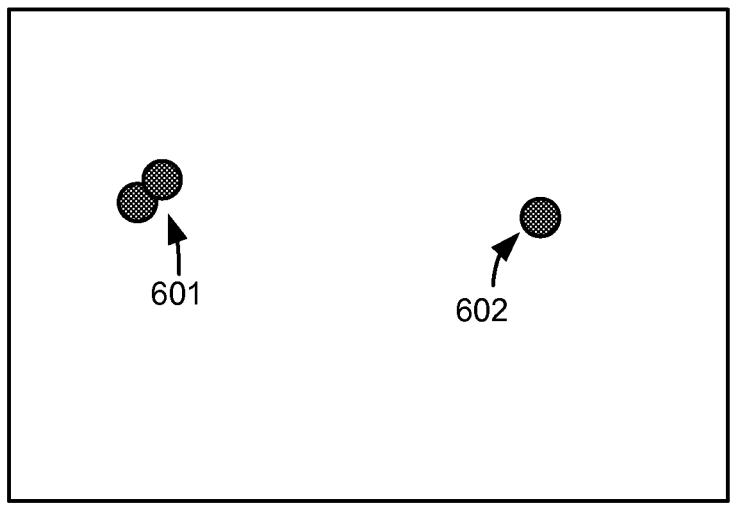
FIG. 6 shows an example diagram of components isolated using image processing.

Isolating connected components (block 403) involves determining whether detected shapes relate to a single component or to separate components. Each component relates to a touch event. In an example shown in FIG. 6, in which the colors have been inverted to make the diagram clearer, the shape 601 (referred to herein as a 'touch event area') relates to a single connected component (e.g. made by a user using two fingers together to produce the touch input) and the shape 602 relates to a separate component. This analysis may be performed by analyzing the size and shape of each touch event area.

Figure 7:
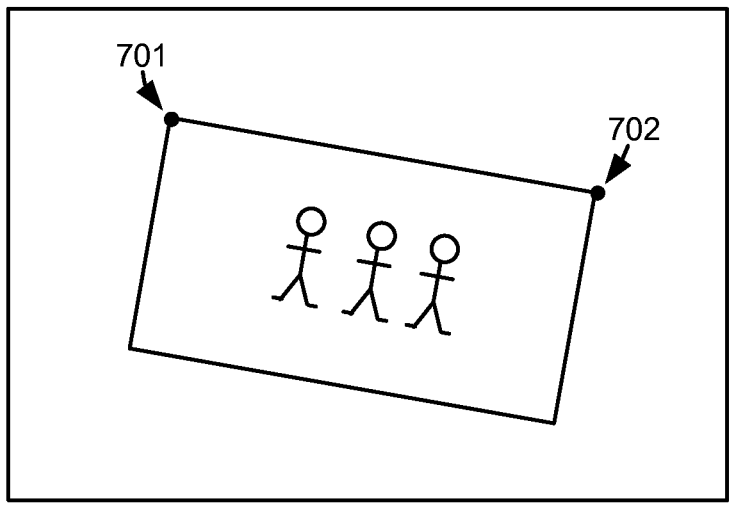
FIG. 7 shows an example diagram of the mapping of the components of FIG. 6 to an example display screen.

Calculating the centre of mass of each component (block 404) converts each touch event area (or component) into a single point (e.g. defined by x,y coordinates) which can then be used as an input touch event position. Applying homography (block 405) then maps the fingertip positions (e.g. the centre of mass positions computed in block 404) that are relative to the detector position to onscreen coordinates where the touch system 200 is used as an overlay to a display system. In an example, the touch event areas shown in FIG. 6 may be mapped to positions on the example display screen shown in FIG. 7. In this example, touch event area 601 is mapped to position 701 on the display and touch event area 602 is mapped to position 702 on the display. These two positions correspond to the corners of a digital image which is displayed and in this application, the user may be using the touch input system to rotate the digital image. Subsequently, the user may move their fingers on the sheet and the image may move in a corresponding manner. In other examples, the touch event areas may be mapped to buttons or other controls which may be shown on the display.

In addition to those image processing techniques described above and shown in FIG. 4, image processing may be used to remove static noise from the detected image, for example using background subtraction. The static noise may be a result of scratches, dirt or other imperfections in or on the light guiding sheet. This technique may be applied automatically when there is no user input to the system, e.g. as part of a calibration routine which may be performed on switch on and/or periodically.

Further example touch detection systems are described below with reference to FIGS. 8-13. As with the systems described above, these systems are described with reference to their orientation as shown in the relevant diagram, however, these descriptions are not limiting to the orientation in use of any of the systems described. For example, whilst the system of FIG. 8 is shown in a horizontal orientation and the system of FIG. 10 is shown in a vertical orientation, they may both be used in any orientation.

Figure 8:
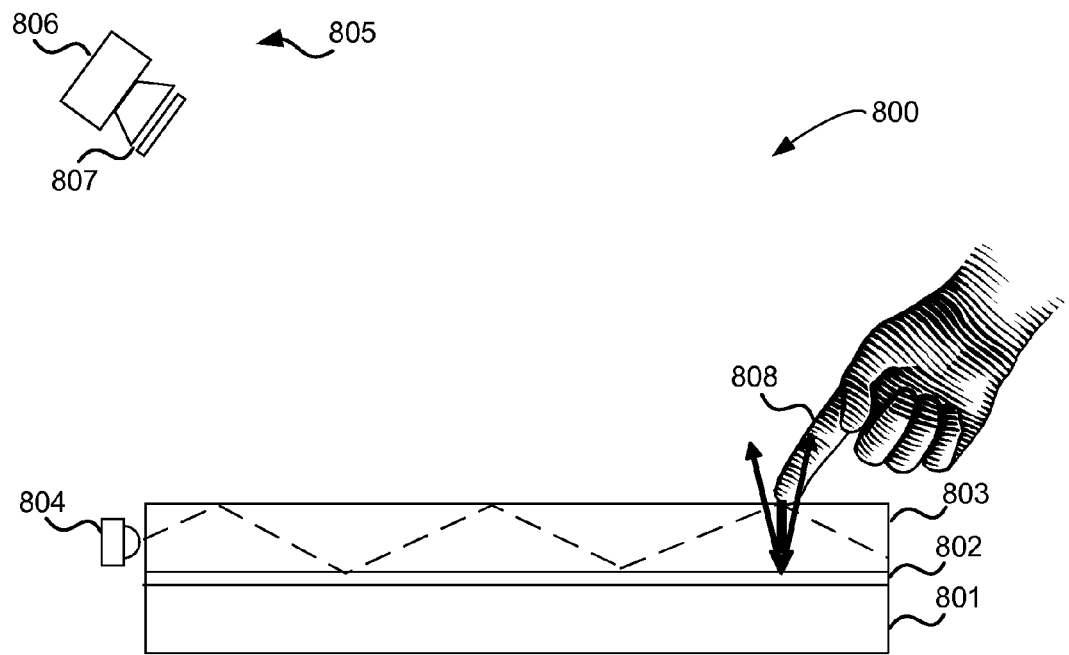
FIGS. 8-13 are schematic diagrams of further example touch detection systems.

FIG. 8 is a schematic diagram of another example touch detection system 800 which comprises a display surface 801, a reflective layer 802, a light guiding sheet 803, a source 804 and a detector 805. The display surface 801 may, for example, comprise an LCD screen (e.g. within a tablet PC). The source comprises an IR LED and the reflective layer 802 is reflective to IR radiation but transparent to visible light. The detector 805 comprises a camera 806 and IR pass filter 807. As the reflective layer 802 is transparent to visible light, but reflective to IR, the visible light emitted by the LCD screen passes through and the reflective layer is not visible to a user. If the reflective layer is symmetric (i.e. its operation is the same irrespective of which way up it is), the layer also stops any IR emitted by the LCD screen. As described above, scattered IR caused by a touch event (e.g. when finger 808 is in contact with the light guiding sheet) is reflected by the reflective layer and is captured by the camera 806. By positioning the camera at a distance from the light guiding sheet and at an angle which is perpendicular or close to perpendicular to the light guiding sheet (e.g. at 80°), the camera can capture scattered light caused by touch events at any position on the light guiding sheet above the display surface and the risk of occlusion is minimized.

The system 800 of FIG. 8 may be combined with a top-down system which uses visible light, and may use stereo cameras, in order to also detect hover events (when the user's hand is close to the light guiding sheet but not in contact) or documents or other objects placed on the light guiding sheet. In such an embodiment an additional camera may be used to capture visible light, or alternatively the IR pass filter 807 may be movable/switchable so that in one position the camera may detect visible light and in another position the camera may detect IR. In another example, a detector may be used which has both IR detecting photosensors and visible light detecting photosensors. These photosensors may, for example, be photodiodes.

Many mobile devices with LCD displays, such as tablet PCs and mobile telephones, have a glass (or plastic) protective sheet over the LCD. Where the touch detection system is integrated within a device, this protective sheet may serve a double purpose—it may provide protection for the underlying LCD and provide the light guiding sheet for the touch detection system.

Figure 9:
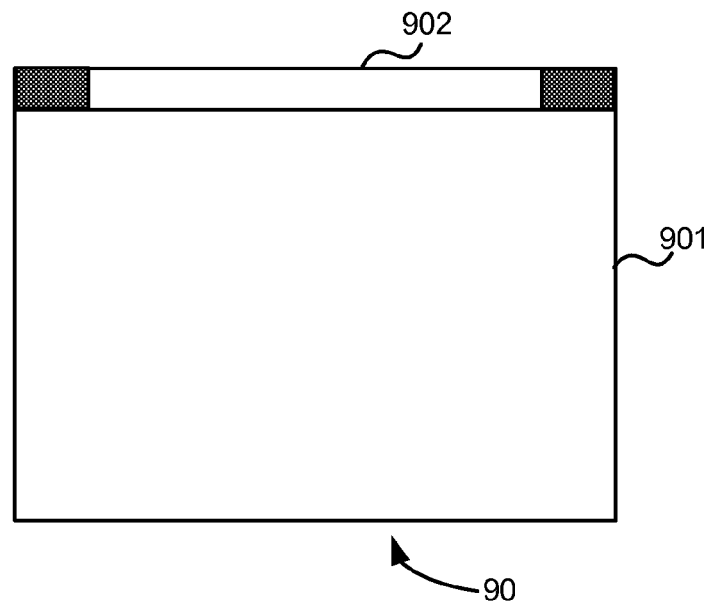
Figure 9:
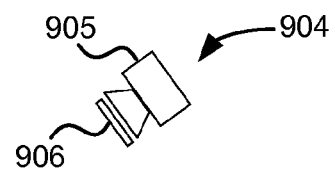
Figure 9:
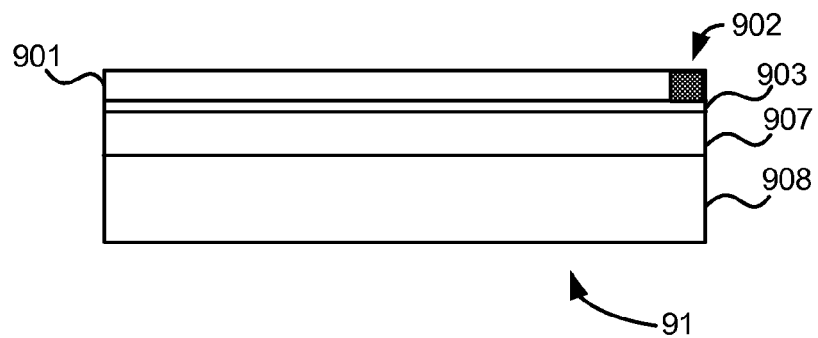
Figure 10:
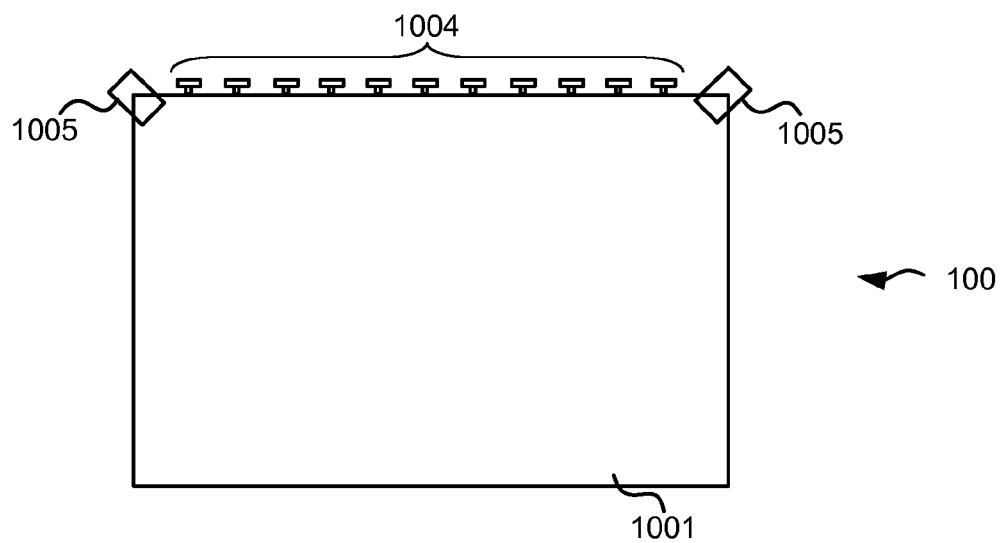
Figure 10:
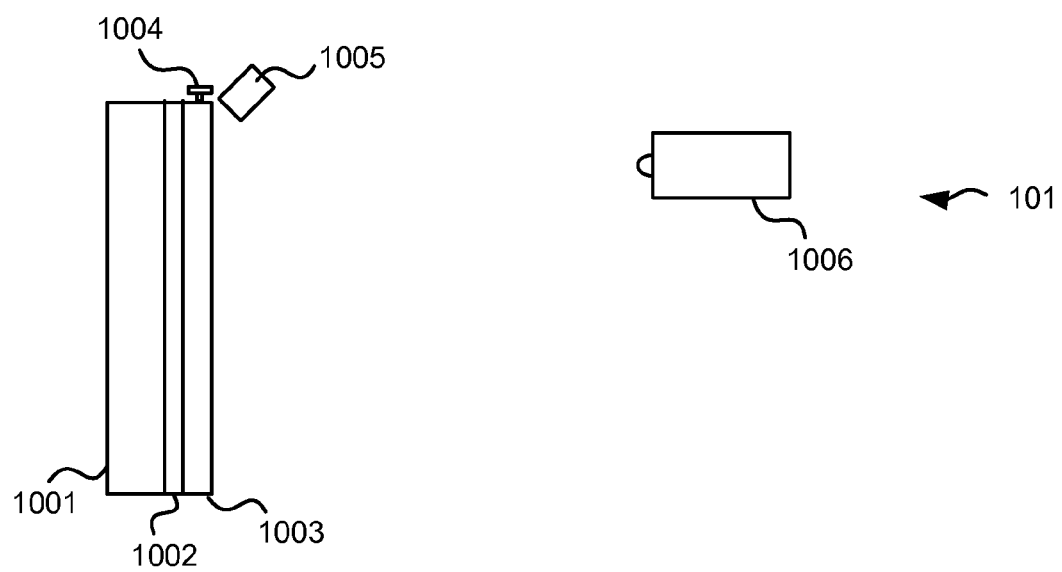

FIG. 9 is a schematic diagram of two different views 90, 91 of an example touch detection system which is integrated with a tablet PC or other computing device. The first view 90 shows the light guiding sheet 901 with an array of sources 902 coupled into one edge, whilst the second view 91 shows a cross section through the system. In this system, as with those described above, the light guiding sheet 901 has a reflective layer 903 behind it and a detector 904 (e.g. a camera 905 and filter 906) in front of it. Underneath the reflective layer (in the orientation shown in FIG. 9), is an LCD 907 and the body 908 of the computing device (which contains the motherboard, processor, memory, hard drive etc).

FIG. 10 is a schematic diagram of two different views 100, 101 of an example touch detection system which includes a projection surface or whiteboard 1001. This system may be integrated with the projection surface/whiteboard 1001 or may be an additional system which can be added to an existing and/or third party projection surface/whiteboard. This system may be much larger than a tablet PC, so as to be suitable for use in a meeting or conference room. FIG. 10 shows a front view 100 of the system and a cross-sectional view 101. In front of the projection surface/whiteboard 1001 is a reflective layer 1002, which as described above, reflects light scattered as a result of a touch event. In front of the reflective layer is the light guiding sheet 1003. An array of sources 1004 are arranged along an edge of the light guiding sheet and two cameras 1005 are located in front of the light guiding sheet and at an angle to the sheet in order to be able to detect scattered light over a portion of the sheet. In an example, the cameras 1005 may be ceiling mounted. Having the cameras close to the sheet, as shown in FIG. 10, results in a lower profile system, however each camera may only be able to detect scattered light from touch events in part of the sheet. In this example, two cameras are used in order to enable detection over the whole sheet; in other examples, more cameras may be used. Where the surface 1001 is a projection surface, the system may also comprise a projector 1006 which projects the display image onto the surface.

In a variation of that shown in FIG. 10, the cameras 1005 may be replaced by a camera within or alongside the projector 1006. Whilst the user may occlude the camera's view of the light guiding sheet, visual feedback is provided as the user also occludes the projected image.

In some examples, a filter may be placed in front of the projector 1006 to filter out the wavelength of light which is emitted by sources 1004 and detected by detectors 1005. In an example, where the illuminant is an IR source, an IR filter may be used in front of the projector. This reduces the amount of ambient radiation of the working wavelength (i.e. that of the source and the detector) which is incident on the light guiding sheet.

Whilst the example shown in FIG. 10 uses front projection, i.e. the projector 1006 is on the same side of the projection surface 1001 as the viewer, in another example, rear projection may be used. In rear projection, the projector is on the opposite side of the projection surface to the viewer.

The system of FIG. 10 may enable touch to be used to provide inputs to a computer application (e.g. the graphical user input (GUI) of which is projected using the projector 1006). Where the surface is a whiteboard, the touch inputs may provide simple button replacement (e.g. to cause the image drawn on the whiteboard to be printed) and in this case, the touch area may only be a portion of the whiteboard. In such a situation, the reflective layer 1002 and light guiding sheet 1003 may only cover the portion of the whiteboard 1001 and this may result in fewer sources and cameras being required. Where the light guiding sheet 1003 extends all the way across the whiteboard 1001, the light guiding sheet 1003 is the writing surface, rather than the whiteboard 1001 itself. This may mean that the whiteboard surface 1001 need not be a whiteboard but may be any light colored surface, such as a painted wall.

Although the above description refers to the detection of fingertips, other touch events may be detected where the touch event causes the scattering of light (as described above). Other parts of the body may be detected instead of or in addition to fingers (e.g. in a dance or other interactive application, contact of feet on the light guiding sheet may be detected). The contact between a whiteboard marker and the light guiding sheet or the ink from a whiteboard marker may be sufficient to cause such scattering and in such an embodiment the detected touch events may enable the images drawn on the whiteboard to be captured by the cameras.

In the example of FIG. 10 (and the other examples described herein), the reflective layer 1002 may be integrated with the layer behind it, e.g. with the projection surface/whiteboard 1001.

In a further variation of the system of FIG. 10, the cameras 1005 (or a single camera) may be orientated such that it is parallel to the light guiding sheet 1003. The camera may still detect the scattered light caused by a fingertip in contact with the sheet because scattered IR light causes the entire fingertip to be illuminated by IR light and therefore detection of IR in a plane which is parallel to the light guiding sheet enables detection of touch events. The separation of this plane and the light guiding sheet is of the order of a few centimeters or less. In the examples of low profile devices described below with reference to FIGS. 11 and 12, the detectors may be detecting in a plane which is parallel to the light guiding sheet or in a plane which is at an angle to the light guiding sheet.

Figure 11:
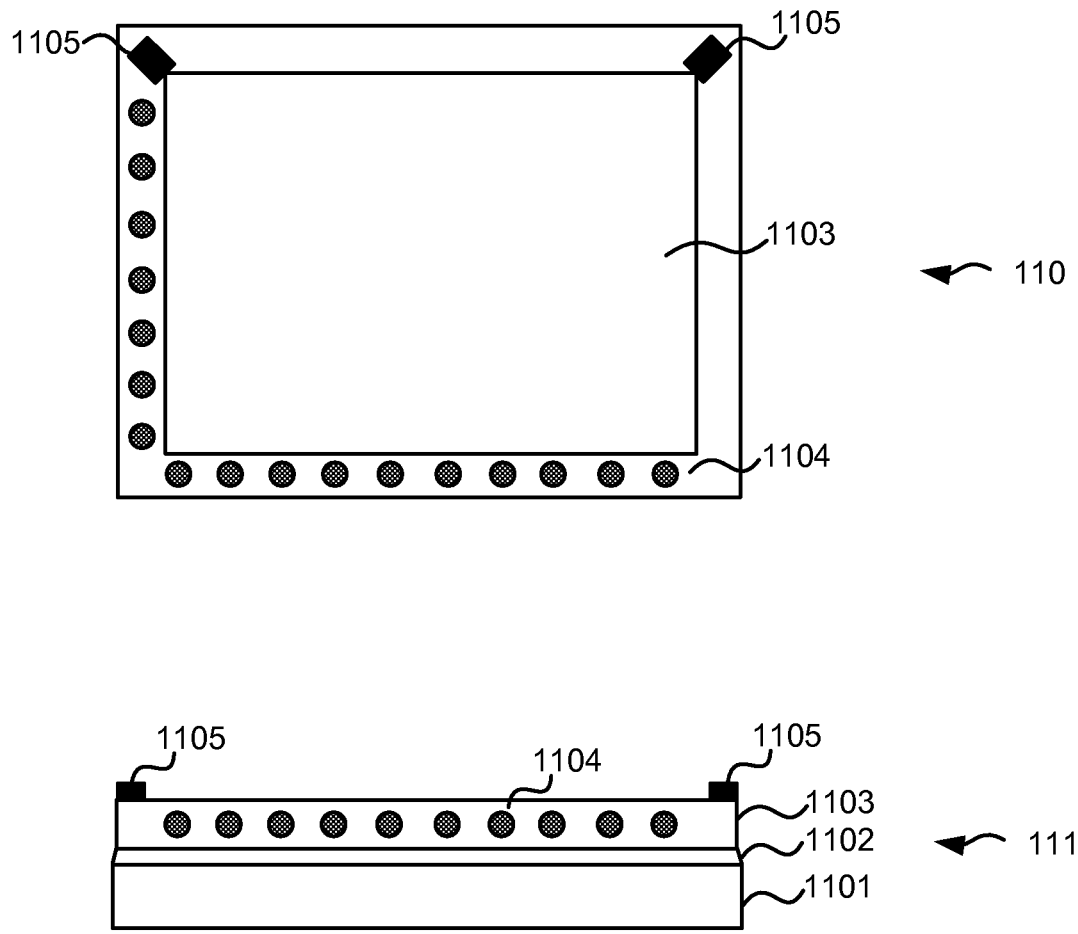

FIG. 11 is a schematic diagram of two different views 110, 111 of an example low profile touch detection system. The system comprises an LCD 1101, a reflective layer 1102, a light guiding sheet 1103, arrays of sources 1104 and two photosensors 1105. The arrays of sources 1104 are arranged along two (non-parallel) sides of the light guiding sheet 1103 and the two photosensors 1105 may be placed at corners of the sheet in a plane above the light guiding sheet (as shown in view 111). In other examples, the photosensors 1105 may be located elsewhere and more/fewer may be provided. In the system of FIG. 11, the photosensors 1105 may be single pixel detectors. In this system, all the sources may not be illuminated substantially simultaneously, but instead the sources may be illuminated in sequence. This enables the single pixel sensors 1105 to obtain two dimensional information about the location of the touch event. In an example, the sources may be scanned along one edge and then along the other edge. In this example, it may only be necessary to have one photosensor in order to locate the approximate position of the touch event. In another example, sources may only be provided along a single edge, then two detectors may be required (e.g. as shown in FIG. 11) in order to obtain both x and y information about the position of the touch event. In other embodiments, the pattern of the illumination of the source may be varied in order to obtain further information and the pattern of any scan may be controlled to first coarsely locate the touch point and then to provide a more accurate position.

Figure 12:
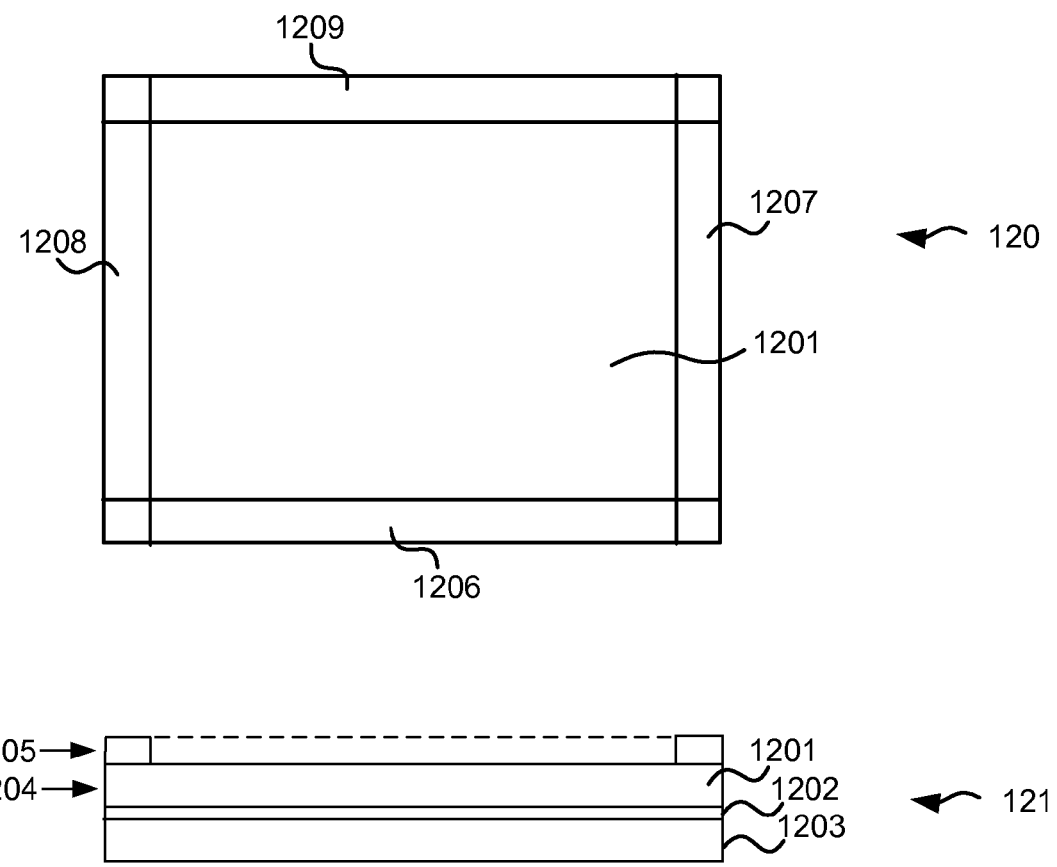

FIG. 12 is a schematic diagram of two different views 120, 121 of another example low profile touch detection system. This system comprises one or more arrays of sources and one or more arrays of detectors along with a light guiding sheet 1201, reflective layer 1202 and LCD 1203. The arrays of sources are located in the same plane 1204 as the light guiding sheet whilst the arrays of detectors are provided in a plane 1205 above the light guiding sheet. The array of detectors may comprise a linear 1D array of photosensors. As described above, the detectors may detect in a plane which is parallel to or at an angle to the light guiding sheet. In a first example, an array of sources may be provided along one edge 1206 and an array of detectors provided along a perpendicular edge 1207. By illuminating the sources in sequence and synchronizing this with the detected signal, both the x and y position of the touch event may be detected. In another example, a second array of sources may be provided along an edge 1208 perpendicular to the first array of sources and parallel to the first array of detectors. A second array of detectors may also be provided along an edge 1209 perpendicular to the first array of detectors and parallel to the first array of sources. Again the sequence of illumination of sources may be fixed or viable.

Where a suitable detector is used, the sources may be modulated and the detected signal filtered in order to reject ambient light of the same wavelength (or wavelength range) as that used for the touch detection system. In an example, the sources may be IR LEDs which may be modulated at 50 kHz and the detected signal may be filtered to only consider the 50 kHz component. In another example, cameras with high frame rates may be used. The rejection of ambient light may be used particularly where visible (e.g. red) light is used instead of IR. The detector may include a polarizing filter to filter out light emitted from any display (e.g. an LCD) within the system (or that is used in conjunction with the system). In addition or instead the detector may comprise a wavelength selective filter so that it only detects the wavelength being used (e.g. a chromatic filter with a filter characteristic that results in the detector only detecting red light).

Figure 13:
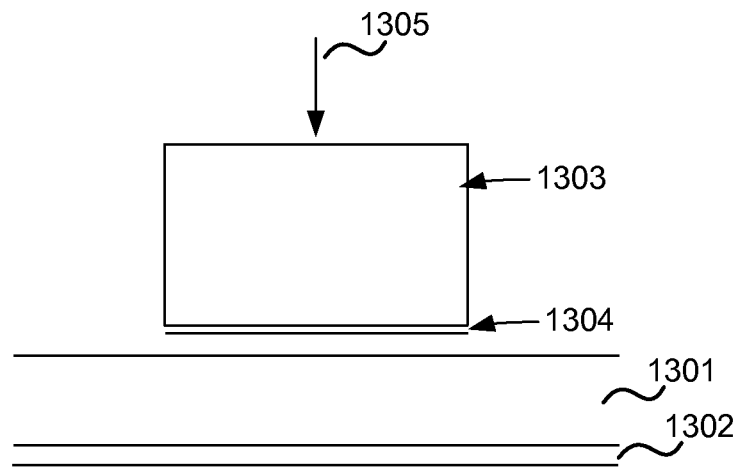

Whilst the examples described above relate principally to the detection of fingertips, the methods may also be applied to detect other objects which are capable of disrupting the total internal reflection within the light guiding sheet when they are brought into contact with the surface of that sheet. Examples of other objects which may be used include white board markers and reusable pressure sensitive adhesive (such as Blu-tak™). FIG. 13 shows a schematic diagram of another object being brought into contact with a light guiding sheet 1301 behind which is located the reflective layer 1302 as described above. The object 1303 which may be a gaming piece user interface element or any other object has a layer 1304 on its base which ensures that the TIR is disrupted when pressure is applied to push the object 1303 onto the light guiding sheet (as indicated by arrow 1305). This layer 1304 may comprise a coupling film, such as rosco grey. In an example the coupling film may be shaped to define a particular pattern which can then be detected by the detector. In one such example the coupling film may be in the shape of a bar code which causes the scattered reflective light captured by the detector to be in the shape of a bar code which may subsequently be processed and read.

Figure 14:
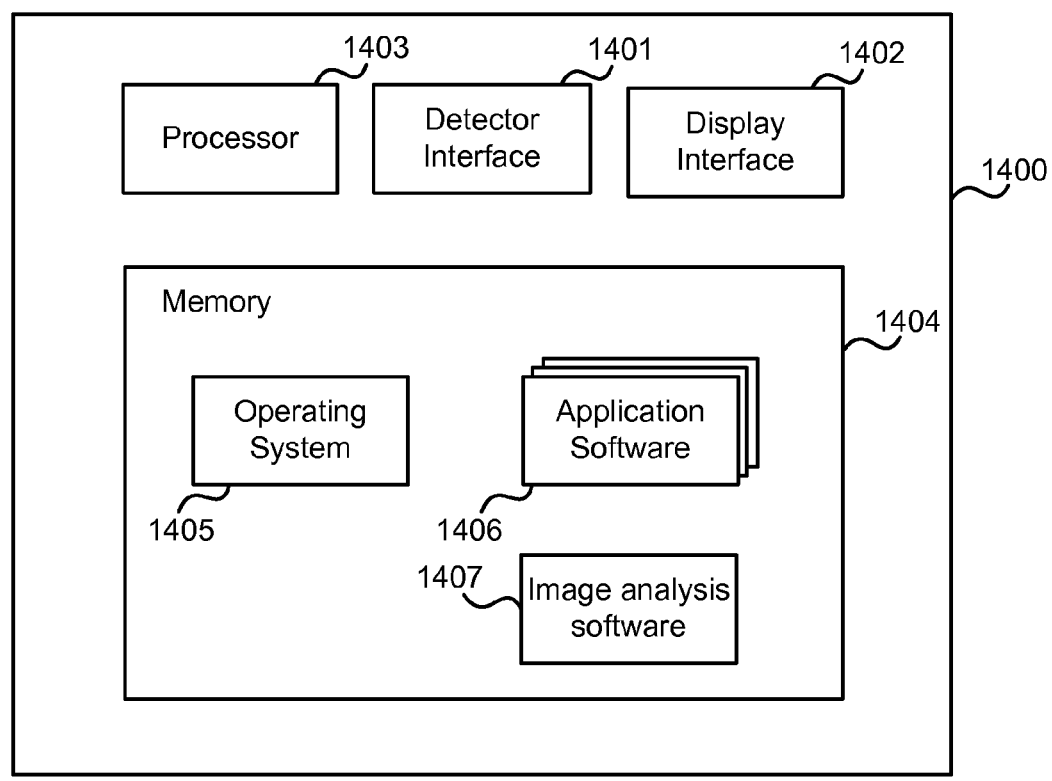
FIG. 14 illustrates an exemplary computing-based device which may be used as part of, or in combination with, any of the touch detection systems described.

FIG. 14 illustrates various components of an exemplary computing-based device 1400 which may be implemented as any form of a computing and/or electronic device, and embodiments of which may be used in combination with, or as part of, any of the touch detection systems described herein.

The computing-based device 1400 comprises a detector interface 1301 arranged to receive the detector signal from the touch detection system (e.g. the signal from detector 204 in system 200) and may also comprise a display interface 1402 for outputting signals to a display (e.g. the LCD 801 in system 800). Where the touch detection system does not comprise a display (e.g. as in FIG. 2), this display interface may connect to a separate display (e.g. onto which the system of FIG. 2 is overlaid).

Computing-based device 1400 also comprises one or more processors 1403 which may be microprocessors, controllers or any other suitable type of processors for processing computing executable instructions to control the operation of the device. The computer executable instructions may be provided using any computer-readable media, such as memory 1404. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Platform software comprising an operating system 1405 or any other suitable platform software may be provided at the computing-based device (e.g. stored in memory 1404) to enable application software 1406, 1407 to be executed on the device. The application software 1406 may include the applications which may be controlled using touch inputs detected by a touch detection system as described above. The application software may include image analysis software 1407 and any other software necessary to operate a touch detection system as described herein.

The computing-based device may comprise one or more inputs which are of any suitable type for receiving media content, Internet Protocol (IP) input, etc. The device may also comprise additional interfaces, such as a communication interface and one or more outputs.

Although the present examples are described and illustrated herein as being implemented in a PC based system, the system described is provided as an example and not a limitation. As those skilled in the art will appreciate, the present examples are suitable for application in a variety of different types of computing and/or display systems.

Whilst in the examples described above the light guiding sheet is shown to be the same size as the underlying tablet PC whiteboard or projection surface this is by way of example only. In other embodiments, the light guiding sheet may be larger or smaller than any underlying surface.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants, digital music players, gaming devices and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person. It will further be understood that reference to 'an' item refers to one or more of those items.

It will be understood that the benefits and advantages described above may relate to one embodiment or may relate to several embodiments. Furthermore, embodiments are not limited to those which solve any or all of the problems of known systems.

The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A touch detection system comprising:
   a light guiding sheet having a touch surface and a rear surface;
   a source arranged to couple light into an edge of the light guiding sheet, such that the light is totally internally reflected within a working area of the light guiding sheet;
   a reflective layer in proximity to the rear surface of the light guiding sheet;
   a display surface in proximity to the reflective layer;
   a detector arranged in front of the touch surface of the light guiding sheet and opposite to the reflective layer, to detect light emitted by the source, scattered as a result of a touch event and reflected by the reflective layer; and
   a computing-based device comprising:
      a processor;
      an interface to the display surface;
      an interface to the detector; and
      a memory arranged to store executable instructions to cause the processor to:
      perform image analysis on a signal from the detector to identify a touch event, the image analysis comprising;
         generating an area of interest inside the working area of the light guide sheet;
         filtering the signal to remove all data outside the area of interest; and
         converting the signal into a binary image using a threshold.

2. A touch detection system according to claim 1, wherein the source comprises an infra-red source.

3. A touch detection system according to claim 2, wherein the reflective layer reflects infra-red and is transparent to visible light.

4. A touch detection system according to claim 2, wherein the detector comprises an infra-red sensitive detector.

5. A touch detection system according to claim 1, wherein the display surface includes the reflective layer.

6. A touch detection system according to claim 1, wherein the display surface comprises one of a liquid crystal display, a whiteboard and a projector screen.

7. A touch detection system according to claim 1, wherein the memory is further arranged to store executable instructions to cause the processor to:
   control an application based on the touch event.

8. A touch detection system according to claim 7, wherein the memory is further arranged to store executable instructions to cause the processor to:
   output data to the display surface via the interface to the display surface, to cause the display surface to display a graphical user interface of the application.

9. A touch detection system according to claim 1, wherein the source comprises an array of sources.

10. A touch detection system according to claim 9, wherein in use the sources are illuminated sequentially.

11. A touch detection system according to claim 1, wherein in use the source is modulated.

12. A method of detecting touch events comprising:
   projecting light into a light guiding sheet such that it undergoes total internal reflection;
   detecting, by a detector arranged in front of a first surface of the light guiding sheet, light scattered by a touch event on the first surface of the light guiding sheet and reflected by a reflective layer in proximity to a second surface of the light guiding sheet;
   generating a signal representative of the light detected;
   performing image processing on the signal to identify a touch event, the image processing comprising;
      generating an area of interest inside an area of the light guide sheet;
      filtering the signal to remove all data outside the area of interest; and
      converting the signal into a binary image using a threshold.

13. A method according to claim 12, further comprising:
   controlling an application based on the touch event.

14. A method according to claim 13, further comprising:
   displaying a graphical user interface for the application on a display surface in proximity to the reflective layer.

15. A touch sensitive user input device comprising:
   a light guiding layer;
   a source arranged to couple light into an edge of the light guiding layer;
   a reflective layer in proximity to a first surface of the light guiding layer and arranged to reflect light scattered by a user touching a second surface of the light guiding layer;
   a detector arranged in front of the second surface of the light guiding layer, the detector to detect light reflected by the reflective layer; and
   a computing-based device comprising:
      a processor and memory arranged to store executable instructions to cause the processor to:
      generate a signal representative of the light detected; and
      perform image processing on the signal to identify a touch event, the image processing comprising;
         generating an area of interest inside an area of the light guiding layer;
         filtering the signal to remove all data outside the area of interest; and
         converting the signal into a binary image using a threshold.

16. A touch sensitive user input device according to claim 15, further comprising:
   a display in proximity to the reflective layer,
   and wherein the reflective layer is arranged to reflect at least one wavelength of light emitted by the source and to be transparent to at least one wavelength of light emitted by the display.

* * * * *